US007861477B2

(12) United States Patent
Donetti et al.

(10) Patent No.: US 7,861,477 B2
(45) Date of Patent: Jan. 4, 2011

(54) METHOD FOR MAKING A SOUND-INSULATING LOAD-BEARING FLOOR

(75) Inventors: Raffaella Donetti, Milan (IT); Massimo Marini, Milan (IT); Massimiliano Pavan, Milan (IT); Elio Ganci, Milan (IT); Diego Tirelli, Milan (IT); Franco Perruzzotti, Milan (IT)

(73) Assignee: Pirelli & C. S.p.A., Milan (IT)

( * ) Notice: Subject to any disclaimer, the term of this patent is extended or adjusted under 35 U.S.C. 154(b) by 25 days.

(21) Appl. No.: 11/921,862

(22) PCT Filed: Jun. 10, 2005

(86) PCT No.: PCT/EP2005/006260

§ 371 (c)(1),
(2), (4) Date: Jul. 24, 2009

(87) PCT Pub. No.: WO2006/131138

PCT Pub. Date: Dec. 14, 2006

(65) Prior Publication Data

US 2009/0293413 A1    Dec. 3, 2009

(51) Int. Cl.
*E04B 1/00* (2006.01)
(52) U.S. Cl. .................................... 52/403.1; 52/741.1
(58) Field of Classification Search ............... 52/403.1, 52/741.4, 309.1, 309.13
See application file for complete search history.

(56) References Cited

U.S. PATENT DOCUMENTS

| | | | | |
|---|---|---|---|---|
| 4,010,123 A | * | 3/1977 | Blunt et al. | .................... 521/83 |
| 4,495,240 A | * | 1/1985 | McCarthy | ................ 428/319.1 |
| 4,588,634 A | * | 5/1986 | Pagen et al. | .................... 442/90 |
| 4,698,249 A | * | 10/1987 | Brown | .......................... 428/44 |
| 5,093,394 A | * | 3/1992 | Rees et al. | ..................... 524/68 |
| 5,094,318 A | * | 3/1992 | Maeda et al. | ............... 181/290 |
| 5,956,921 A | * | 9/1999 | Fleck et al. | ................ 52/741.3 |
| 6,200,638 B1 | * | 3/2001 | Ordway | ....................... 427/355 |
| 6,828,020 B2 | * | 12/2004 | Fisher et al. | .......... 428/355 EN |
| 2005/0050846 A1 | | 3/2005 | Surace et al. | |

FOREIGN PATENT DOCUMENTS

| | | |
|---|---|---|
| DE | 43 40 478 A1 | 6/1995 |
| EP | 1 001 111 A2 | 5/2000 |
| EP | 1 375 778 A1 | 1/2004 |
| FR | 2 221 465 | 10/1974 |
| FR | 2 433 617 | 3/1980 |
| FR | 2 852 551 A1 | 9/2004 |
| WO | WO 00/26485 A1 | 5/2000 |
| WO | WO 00/50707 A1 | 8/2000 |
| WO | WO 02/48478 A1 | 6/2002 |

* cited by examiner

*Primary Examiner*—Richard E Chilcot, Jr.
*Assistant Examiner*—Mark R Wendell
(74) *Attorney, Agent, or Firm*—Finnegan, Henderson, Farabow, Garrett & Dunner, L.L.P.

(57) ABSTRACT

A method for making a sound-insulating load-bearing floor, includes the following steps: providing a load-bearing floor; applying a sound-insulating material onto the load-bearing floor so as to form a substantially continuous coating layer; allowing the substantially continuous coating layer to dry; wherein the sound-insulating material includes: 40% by weight to 95% by weight, preferably 60% by weight to 90% by weight, with respect to the total weight of the sound-insulating material, of at least one rubber in a subdivided form; 5% by weight to 60% by weight, preferably 10% by weight to 40% by weight, with respect to the total weight of the sound-insulating material, of at least one binding agent including at least one water-dispersible polymer having a glass transition temperature ($T_g$) of −50° C. to +50° C., preferably of −40° C. to +10° C.

53 Claims, 1 Drawing Sheet

METHOD FOR MAKING A SOUND-INSULATING LOAD-BEARING FLOOR

CROSS REFERENCE TO RELATED APPLICATION

This application is a national phase application based on PCT/EP2005/006260, filed Jun. 10, 2005, the content of which is incorporated herein by reference.

BACKGROUND OF THE INVENTION

1. Field of the Invention

The present invention relates to a method for making a sound-insulating load-bearing floor.

In particular, the present invention relates to a method for making a sound-insulating load-bearing floor, said method comprising the step of applying onto said load-bearing floor a sound-insulating material including at least one rubber in a subdivided form and at least one binding agent.

In a further aspect, the present invention also relates to a sound-insulating material including at least one rubber in a subdivided form and at least one binding agent.

In a still further aspect, the present invention also relates to a building structure including at least one load-bearing floor, said load-bearing floor comprising a sound-insulating material including at least one rubber in a subdivided form and at least one binding agent.

2. Description of the Related Art

In building constructions, in particular in building constructions including two or more stories, it is known to include a sound-insulating material on the load-bearing floor of the upper floors. The sound-insulating material minimizes the pressure of sound generated into a room and traveling downward through the load-bearing floor. Sound-insulating material functions by reflecting sound waves, absorbing sound waves, and/or disrupting sound waves.

Conventional sound-insulating materials comprise pre-formed sheets of cork, asphalt, or other materials such as, for example, foamed polyethylene or foamed polyurethane.

However, said sound insulating materials may show some disadvantages.

For example, the asphalt typically comprises about 80% by weight of tar, the remainder including clay, solvents, and other fillers. One disadvantage of the asphalt is that upon aging, it tends to harden. It also hardens in cold weather. When asphalt hardens, it tends to crack if the floor expands or contracts (e.g. as a consequence of temperatures changes). Similarly, since cork comprises a matrix of particles pressed together, the cork also tends to develop cracks if the floor expands or contracts (e.g. as a consequence of temperatures changes).

Other sound-insulating materials have been already suggested in the art.

For example, International. Patent Application WO 02/48478 relates to a light soundproof floor-filling structure for filling the space between a floor surface and the level of the laying plane of the walking-on floor covering. Said soundproof floor-filling structure consists of a mixture of concrete as air-hardening binder and a given amount of grains of resin materials which may be selected from polyvinyl resins, polyethylene, polypropylene, polyvinylchloride, caoutchouc, rubbers in general, polycarbons, silicon resins, plastics of different kinds. Metal elements such as copper and tin may be present as either pure metal or alloys. The abovementioned structure is said to have the following features: lightness, soundproofing, compactness, workability, mechanical strength and environmental compatibility.

International Patent Application WO 00/26485 relates to an acoustic insulating material with a filler which is mainly made of granules of a sound-deadening component, mixed with a binding agent, such that an almost coherent mass is formed. Said filler mainly contains rubber granules. Said binding agent is made on the basis of polyurethane and preferably consists of a polyurethane glue. A sound-insulating sprung floor provided with the abovementioned insulating material and resting on a load-bearing floor, and a method for making such a floor, are also disclosed.

French Patent Application FR 2,221,465 relates to a material made from waste rubber particles, in particular waste rubber particles derived from tyres, and a synthetic elastomeric binding agent, preferably a moisture-hardening isocyanate or polyisocyanate or a two-component polyurethane. Said binding agent is of cellular structure and fills only partly the spaces between the rubber particles. The abovementioned material is said to be suitable as a floor underlay.

International Patent Application WO 00/50707 relates to a solid paste which can be applied with a trowel to form regularly spaced striae, comprising an adhesive-type elastomeric resin forming 50%-70% of the volume of the paste, 30-90 mesh rubber-granules forming 30%-50% of the volume of the paste, all of which is mixed with air to produce a foam. The adhesive is water-based. The rubber granules come from recycled tyres which are shredded into granules and ground. A method of application of said solid paste is also disclosed, said method comprising the following steps: take a container with the adhesive-type elastomeric resin superposed on rubber granules in a suspension in the air, insert a mechanical mixer and agitate for two to five minutes in order to form a homogeneous emulsion containing air, rubber and resin, apply the product to a hard surface using an adhesive comb in order to form said striae and wedge tiles on top of the striae. The abovementioned solid paste is said to have sound-insulating properties.

SUMMARY OF THE INVENTION

According to the Applicant, the sound-insulating materials as described above may have some disadvantages.

For example, when concrete is used as an air-hardening binder, the sound-insulating materials has low sound-insulating properties because of the stiffness of the concrete. On the other hand, the use of isocyanates or polyisocyanates as binding agents has to be avoided because of the toxicity of said substances which leads to risks for both the environment and the health of the operators. Moreover, in the case of fire, isocyanates, polyisocyanates or polyurethanes, may release cyanidric acid. Finally, when a water-based adhesive-type elastomeric resin is used, problems related to its stability may arise. The elastomeric resin may coagulate so forming a non-homogeneous adhesive mixture: the presence of coagulums may negatively affect the sound-insulating properties of said adhesive mixture.

The Applicant has now found that it is possible to make a sound-insulating load-bearing floor by applying onto said load-bearing floor a sound-insulating material including at least one rubber in a subdivided form and at least one binding agent, said binding agent comprising at least one water-dispersible polymer. Said sound-insulating material has good sound-insulating properties. Furthermore, said sound-insulating material maintains its sound-insulating properties upon aging. Moreover, said sound-insulating material has a reduced dynamic stiffness, in particular, a dynamic stiffness, measured according to standard ISO 9052-1:1989, lower than 150 MN/m³. Said sound-insulating material also shows vibration damping properties. Furthermore, said sound-insulating material shows a good compression resistance after drying. Additionally, the binding agent used in said sound-insulating material does not contain harmful substances and does not release harmful substances in the case of fire.

According to a first aspect, the present invention relates to a method for making a sound-insulating load-bearing floor, said method comprising the following steps:

providing a load-bearing floor;

applying a sound-insulating material onto said load-bearing floor so as to form a substantially continuous coating layer;

allowing said substantially continuous coating layer to dry;

wherein said sound-insulating material includes:

from 40% by weight to 95% by weight, preferably from 60% by weight to 90% by weight, with respect to the total weight of the sound-insulating material, of at least one rubber in a subdivided form;

from 5% by weight to 60% by weight, preferably from 10% by weight to 40% by weight, with respect to the total weight of the sound-insulating material, of at least one binding agent comprising at least one water-dispersible polymer having a glass transition temperature ($T_g$) of from −50° C. to +50° C., preferably of from −40° C. to +10° C.

Said glass transition temperature may be measured according to known techniques such as, for example, by Differential Scanning Calorimetry (DSC): further details regarding the DSC analysis will be described in the examples given hereinbelow.

According to one preferred embodiment, said step of applying a sound-insulating material, further comprises the step of making pre-formed sheets of said sound insulating material.

According to one preferred embodiment, said sound-insulating material is applied directly in contact with said load-bearing floor. Alternatively, at least one intermediate layer is interposed between the load-bearing floor and the sound-insulating material.

According to a further preferred embodiment, said method further comprises the step of applying a covering floor onto said load-bearing floor. Preferably, said covering floor is applied onto said sound-insulating material.

According to a further preferred embodiment, said sound-insulating material is applied onto said covering floor.

According to a further preferred embodiment, said method further comprises the step of applying a protective foil onto said sound-insulating material. Preferably, said step is carried out before the application of said covering floor onto said sound-insulating material. Said protective foil may be selected, for example, from: polyethylene sheets, paper sheets, nylon sheets, woven-nonwoven sheets.

According to a further aspect, the present invention also relates to a sound-insulating material including:

from 40% by weight to 95% by weight, preferably from 60% by weight to 90% by weight, with respect to the total weight of the sound-insulating material, of at least one rubber in a subdivided form;

from 5% by weight to 60% by weight, preferably from 10% by weight to 40% by weight, with respect to the total weight of the sound-insulating material, of at least one binding agent comprising at least one water-dispersible polymer having a glass transition temperature ($T_g$) of from −50° C. to +50° C., preferably of from −40° C. to +10° C.

According to a further aspect, the present invention also relates to a building structure including at least one load-bearing floor, said load-bearing floor comprising a sound-insulating material including:

from 40% by weight to 95% by weight, preferably from 60% by weight to 90% by weight, with respect to the total weight of the sound-insulating material, of at least one rubber in a subdivided form;

from 5% by weight to 60% by weight, preferably from 10% by weight to 40% by weight, with respect to the total weight of the sound-insulating material, of at least one binding agent comprising at least one water-dispersible polymer having a glass transition temperature ($T_g$) of from −50° C. to +50° C., preferably of from −40° C. to +10° C.

According to one preferred embodiment, said sound insulating material has, in a dry form, a dynamic stiffness measured according to standard ISO 9052-1:1989, lower than 150 MN/m³, preferably lower than 100 MN/m³, more preferably of from 10 MN/m³ to 80 MN/m³.

According to a further preferred embodiment, said sound-insulating material has, in a dry form, a noise index (L), which is a measure of its sound-insulating properties, measured according to standard ISO 140-8:1997, on a sample of said sound-insulating material having a 10 mm thickness, not higher than 65 dB, preferably not higher than 63 dB.

According to one preferred embodiment, said sound-insulating material form a substantially continuous coating layer having a thickness of from 5 mm to 50 mm, preferably of from 7 mm to 30 mm.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Said sound-insulating material may be made according to different processes.

According to one preferred embodiment, the process for making a sound-insulating material is carried out by mixing, at a temperature of from −20° C. to +60° C., preferably of from +5° C. to +40° C., for a time of from 10 seconds to 4 hours, preferably of from 60 seconds to 30 minutes, said at least one rubber in a subdivided form with said binding agent, obtaining a homogeneous sound-insulating material. The obtained homogeneous sound-insulating material may be collected in hermetic buckets or tanks and stored for further use.

In the case in which the obtained homogeneous sound-insulating material is not stored, preferably, in order to avoid its pre-drying, the above reported mixing step is carried out not more than 48 hours, preferably from 5 minutes to 24 hours, before the step of applying said sound-insulating material.

Said mixing step may be carried out manually for example in a bucket, or in different mixing devices such as, for example, concrete mixer, cement mixer, concrete pump, cement pump, plaster sprayer.

The step of applying a sound-insulating material may be carried out according to different ways.

According to one preferred embodiment, the step of applying a sound-insulating material is carried out by spreading (for example, by means of a trowel) said sound-insulating material onto said load-bearing floor.

According to a further preferred embodiment, the step of applying a sound-insulating material is carried out by spraying said sound-insulating material onto said load-bearing floor.

According to a further preferred embodiment, said sound-insulating material is made and applied "in situ" by:
- spreading said at least one rubber in a subdivided form onto said load-bearing floor;
- spraying the binding agent over said spreaded rubber in a subdivided form obtaining a sound-insulating material, said sound-insulating material forming a substantially continuous coating layer.

According to one preferred embodiment, said continuous coating layer has a drying time, at 23° C., of from 10 minutes to 72 hours, preferably of from 30 minutes to 24 hours.

According to a further preferred embodiment, as reported above, said sound-insulating material may be previously shaped as pre-formed sheets which will be subsequently applied onto said load-bearing floor. Said pre-formed sheets may be obtained by means of different processes. For example, said pre-formed sheets may be obtained by means of a process comprising:
- mixing said at least one rubber in a subdivided form and said at least one binding agent in a mixing device so as to obtain a homogeneous mixture;
- pouring the obtained homogeneous mixture into a die;
- keeping the homogeneous mixture into said die at a temperature and for a time sufficient to obtain a substantially dry pre-formed sheets.

In order to obtain a substantially continuous coating layer of a sound-insulating material, after having applied said pre-formed sheets onto said load-bearing floor, the gaps optionally present between adjacent pre-formed sheets may be filled with suitable materials, e.g. with a binding agent or with a sound-insulating material, preferably the same used to make the pre-formed sheets according to the present invention.

According to one preferred embodiment, the rubber in a subdivided form which may be used in the present invention, is in the form of powder or granules having a particle size in the range of from 0.1 mm to 15 mm, preferably of from 1.0 mm to 10 mm.

According to one preferred embodiment, the rubber in a subdivided form may be selected, for example, from diene elastomeric polymers or copolymers which may be of natural origin or may be obtained by solution polymerization, emulsion polymerization or gas-phase polymerization of one or more conjugated diolefins, optionally blended with at least one comonomer selected from monovinylarenes and/or polar comonomers in an amount of not more than 60% by weight.

Preferably, the diene elastomeric polymers or copolymers may be selected, for example, from: cis-1,4-polyisoprene (natural or synthetic, preferably natural rubber), 3,4-polyisoprene, polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

Alternatively, the rubber in a subdivided form may be selected from elastomeric polymers of one or more monoolefins with olefinic comonomers or derivatives thereof. Preferably, said elastomeric polymers may be selected, for example, from: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

Preferably, said rubber in a subdivided form may be obtained from a waste rubber derived from the rubber manufacturing processes. More preferably, said rubber in a subdivided form is a vulcanized rubber which may be obtained by grinding or otherwise comminuting any source of vulcanized rubber compound such as, for example, tyres, roofing membranes, hoses, gaskets, and the like, and is preferably obtained from reclaimed or scrap tyres using any conventional method. For example, the vulcanized rubber in a subdivided form may be obtained by mechanical grinding at ambient temperature or in the presence of a cryogenic coolant (i.e. liquid nitrogen). Said vulcanized rubber in a subdivided form may comprise at least one crosslinked diene elastomeric polymer or copolymer, said diene elastomeric polymer or copolymer being selected from those above reported; or at least one crosslinked elastomeric polymer of one or more monoolefins with an olefinic comonomer or derivatives thereof, said elastomeric polymer being selected from those above reported; or mixtures thereof.

According to one preferred embodiment, said water-dispersible polymer is used in the form of an aqueous dispersion. Preferably, said aqueous dispersion comprises from 30% by weight to 90% by weight, preferably from 40% by weight to 70% by weight, with respect to the total weight of the aqueous dispersion, of at least one water-dispersible polymer.

According to a further preferred embodiment, said aqueous dispersion has a Brookfield viscosity, measured at 23° C. and at 250 rpm, of from 0.2 Pa·s to 60 Pa·s, preferably of from 0.5 Pa·s to 30 Pa·s.

Said Brookfield viscosity is measured using a viscosimeter of Brookfield type, model DV3, equipped with a RV6 spindle.

According to a further preferred embodiment, said aqueous dispersion has a minimum film-forming temperature lower than or equal to 10° C., preferably of from −10° C. to +5° C.

Said minimum film-forming temperature is measured according to standard ISO 2115:1996.

According to one preferred embodiment, said water-dispersible polymer may be selected from polymers having a main hydrocarbon chain to which hydrophilic groups are linked.

In the present description and in the claims which follow, by the expression "polymers having a main hydrocarbon chain to which hydrophilic groups are linked" it is meant a polymer wherein hydrophilic groups, either directly or through side groups, are linked to the main hydrocarbon chain, which may be either linear or branched.

In the present description and in the claims which follow, by the expression "hydrophylic groups" it is meant groups which are able to bind water molecules by means of hydrogen bonds.

With regard to said polymers having a main hydrocarbon chain to which hydrophilic groups are linked, said hydrophylic groups, are preferably selected from:
- hydroxyl groups —OH, or derivatives thereof such as, for example, —OR groups (R=alkyl or hydroxyalkyl);
- carboxylic groups —COOH, possibly at least partially in the salt form;
- ester groups —COOR (R=alkyl or hydroxyalkyl);
- amide groups —$CONH_2$;
- sulfonic groups —$SOH_3$, possibly at least partially in the salts form.

According to a further preferred embodiment, said polymers having a main hydrocarbon chain to which hydrophilic groups are linked may be selected from:

(i) homopolymers obtained by the polymerization of an ethylenically unsaturated carboxylic acid monomer or a derivative thereof such as anhydrides, esters or salts; or by the polymerization of an aliphatic vinyl ester monomer; or by the polymerization of an aliphatic vinyl ether monomer;

(ii) copolymers obtained by the copolymerization of at least one aliphatic or aromatic olefinic monomer, with at least one ethylenically unsaturated carboxylic acid monomer or a derivative thereof such as anhydrides, esters or salts, or with at least one aliphatic vinyl ester monomer, or with at least one aliphatic vinyl ether monomer; or copolymers obtained by the polymerization of an ethylenically unsaturated carboxylic acid monomer or a derivative thereof such as anhydrides, esters or salts, with at least one aliphatic vinyl ester monomer, or with at least one aliphatic vinyl ether monomer;

(iii) terpolymers obtained by the polymerization of at least one aliphatic or aromatic olefinic monomer, with at least one ethylenically unsaturated carboxylic acids monomer or a derivative thereof such as anhydrides, esters or salts, and with at least one aliphatic vinyl ester monomer or with at least one aliphatic vinyl ether monomer;

or mixtures thereof.

Preferably, the ethylenically unsaturated carboxylic acid monomer or a derivative thereof may be selected, for example, from: (meth)acrylic acid, maleic acid, fumaric acid, itaconic acid, ethacrylic acid, crotonic acid, citraconic, acid cinnamic acid, maleic anhydride, methyl hydrogen fumarate, benzyl hydrogen maleate, butyl hydrogen maleate, octyl hydrogen itaconate, dodecyl hydrogen citraconate, methyl (meth)acrylate, ethyl (meth)acrylate, propyl (meth)acrylate, butyl (meth)acrylate, hexyl (meth)acrylate, 2-ethylhexyl (meth)acrylate, octyl (meth)acrylate, isooctyl (meth)acrylate, decyl (meth)acrylate, lauryl (meth)acrylate, stearyl (meth) acrylate, benzyl (meth)acrylate, butyl fumarate, butyl maleate, octyl maleate, or mixtures thereof. Acrylic acid, methacrylic acid, or a derivative thereof, or mixtures thereof, are particularly preferred.

Other (meth)acrylic esters monomers which may be used according to the present invention are multifunctional (meth) acrylates which may be selected, for example, from: ethylene glycol monoester of (meth)acrylic acid, propylene glycol monoester of (meth)acrylic acid, glycidyl (meth)acrylate, hydroxyethyl (meth)acrylate, hydroxypropyl (meth)acrylate, hexanediol di(meth)acrylate, methoxymethyl (meth)acrylate, ethoxymethyl (meth)acrylate, esters of (meth)acrylic acid with polyoxyethylene glycol or polyoxypropylene glycol, (meth)acryloyl compounds having a polyoxyalkylene structure, or mixtures thereof.

Preferably, the aliphatic vinyl ester monomer may be selected, for example, from: vinyl formate, vinyl acetate, vinyl propionate, vinyl butyrate, vinyl caproate, vinyl caprylate, vinyl laurate, vinyl stearate, vinyl octylate, vinyl heptanoate, vinyl pelargonate, vinyl-3,6-dioxaheptanoate, vinyl-3,6,9-trioxaundecanoate, vinyl ester of versatic acid, or mixtures thereof. Vinyl acetate is particularly preferred.

Preferably, the aliphatic vinyl ether monomer may be selected, for example, from: methyl vinyl ether, ethyl vinyl ether, propyl vinyl ether, butyl vinyl ether, t-amyl vinyl ether, or mixtures thereof. Methyl vinyl ether is particularly preferred.

Preferably, the aliphatic or aromatic olefinic monomer may be selected, for example, from:

aliphatic olefins containing from 2 to 20 carbon atoms such as, for example, ethylene, propylene, 1,3-butadiene, 1-octene, or mixtures thereof; ethylene is particularly preferred;

aromatic olefins containing from 8 to 20 carbon atoms such as, for example, styrene, p-acetoxystyrene, vinyltoluene, α-methylstyrene, vinyl benzoate, N-vinyl pyrrolidone, vinyl pyridine, or mixtures thereof; styrene is particularly preferred.

Other comonomers which may optionally be used according to the present invention, may be selected from polar monomers such as, for example: vinyl chloride, vinyl sulfonate, vinyl silane, vinylidene chloride, nitriles or amides such as, for example, acrylonitrile, acrylamide, or mixtures thereof. When used, said comonomers are present in the polymer in an amount not higher than or equal to 5% by weight, with respect to the total weight of the polymer.

Specific examples of homopolymers (i) which may be advantageously used according to the present invention are: poly(meth)acrylic acid, polyalkylacrylamide, polyhydroxyalkylate, polyalkylacrylate, polyvinylacetate, polyvinylalcohol, or mixtures thereof.

Specific examples of copolymers (ii) which may be advantageously used according to the present invention are: vinylacetate/ethylene copolymers, vinylacetate/alkylacrylate copolymers, ethylene/alkylacrylate copolymers, vinylacetate/vinylversatate copolymers, vinylacetate/butylmaleate copolymers, styrene/acrylate copolymers, styrene/acrylic acid/copolymers, or mixtures thereof.

Specific examples of terpolymers (iii) which may be advantageously used according to the present invention are: vinylacetate/ethylene/acrylate terpolymers, vinylalcohol/ethylene/vinylacetate terpolymers, or mixtures thereof.

The aqueous dispersion according to the present invention, may be prepared by polymerization of monomers emulsified in water using conventional emulsion polymerization procedures.

The aqueous dispersion according to the present invention, may further comprise protective colloids such as, for example, polyvinyl alcohol, polyvinyl acetate, polyvinyl pirrolidone, polyethylene-glycol distearate, hydroxypropyl methylcellulose, hydroxyethyl cellulose, or mixtures thereof. The polyvinyl alcohol which may be advantageously used according to the present invention, may be a modified polyvinylalcohol (such as, acetoacetylated polyvinyl alcohol), a partially or completely saponified polyvinyl alcohol, or mixtures thereof.

Said aqueous dispersion may further comprise surfactants. Suitable surfactants include non-ionic, anionic, cationic, surfactants, or mixtures thereof. Said surfactants may be selected, for example, from: octylphenoxy polyethoxy ethanol, polysiloxane copolymers, acetylenic alcohol or glycols or their ethoxylated derivatives; ethylene oxide/propylene oxide copolymers; or mixtures thereof.

Said aqueous dispersion may comprise other commonly used additives which may be selected, for example, from: plasticizers such as, for example, polyethylene glycol, dibutyl phthalate, butyl benzyl phthalate, propylene glycol dibenzoate, triethylene glycol polyester of benzoic acid and phthalic acid, alkyd resin plasticizers; humectants such as, for example, glycerin, ethylene glycol, triethylene glycol, propylene glycol, urea, or mixtures thereof; filming aids and coalescing agents such as, for example, esters of lactic acid, 2-butoxy ethanol, esters of phthalic acid (for example, butyl octyl phathalate), 2-(2-butoxy ethoxy)ethanol, ethylene glycol, dyethylene glycol, propylene glycol, diacetone alcohol, or mixtures thereof; or mixtures thereof.

Said aqueous dispersion may further comprise inorganic fillers such as, for example, sand, silica, calcium carbonate, calcium silicates, barium sulfates, talc, mica, carbon black, or mixtures thereof; pigments; dyes; antiseptic agents; anti-foaming agents; or mixtures thereof.

In order to speed up the drying of said aqueous dispersion, solvents such as, for example, acetone, ethanol, or mixtures thereof, may be added.

Examples of aqueous dispersions of homopolymers (i), or copolymers (ii), or terpolymers (iii), which may be used according to the present invention and which are commercially available, are the products known as Vinavil®, Ravemul® or Crilat®, from Vinavil, or Airflex® from Air Products.

BRIEF DESCRIPTION OF THE DRAWING

The present invention will now be illustrated in further detail by means of the attached FIG. 1 which represents a schematic cross section of a portion of a load-bearing floor comprising a coating layer made from the sound-insulating material according to an embodiment of the present invention.

DETAILED DESCRIPTION OF THE INVENTION

Figure 1:
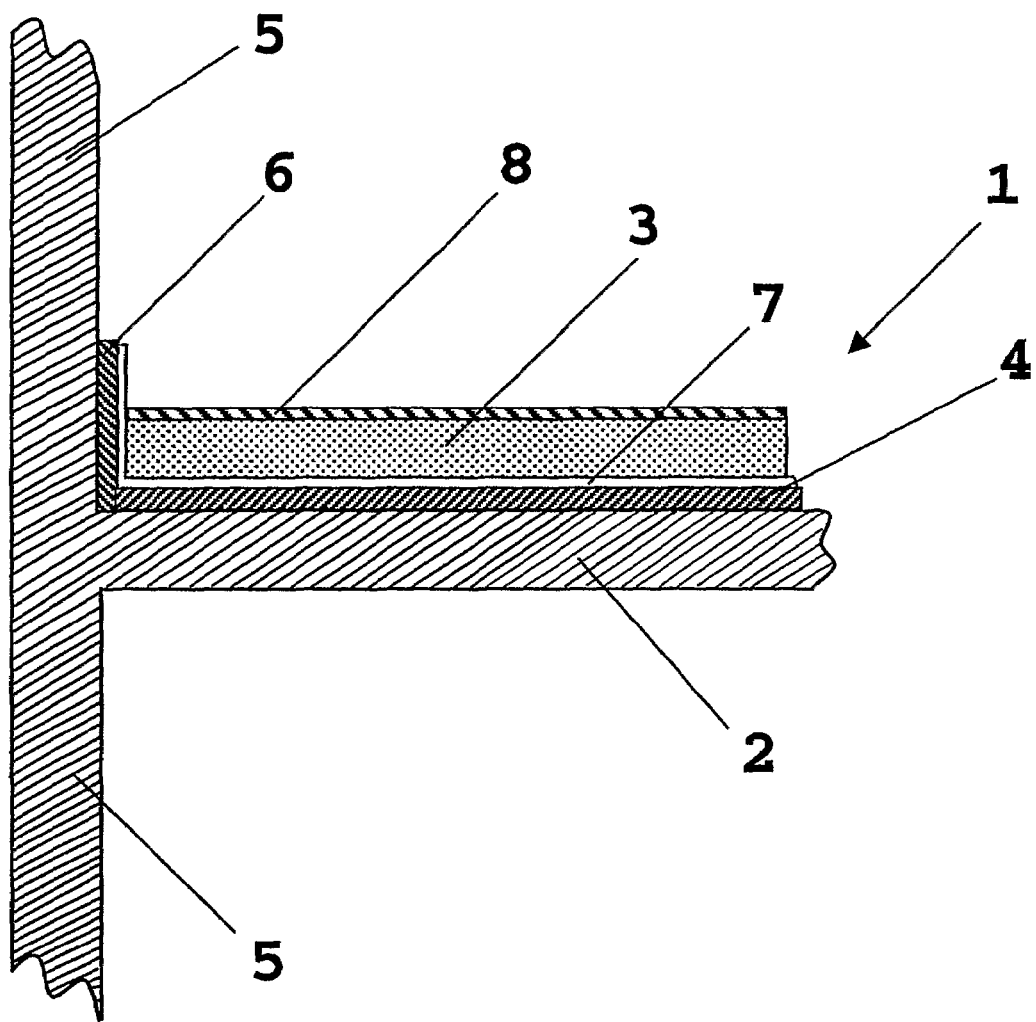

A sprung floor 1 is provided on top of a load-bearing floor 2 associated with the walls 5. Said sprung floor 1 comprises a covering floor 3 which rests on a coating layer 4 made from the sound-insulating material according to the present invention and which does not have any direct contact with said load-bearing floor 2 or with the walls 5. Preferably, said coating layer 4 has a thickness of from 5 mm to 50 mm, more preferably of from 7 mm to 30 mm.

According to FIG. 1 the coating layer 4 is separated from the walls 5 by means of a stranding strip 6, said stranding strip 6 being usually made of a sound-insulating material such as, for example, polyethylene foam, polyurethane foam, rubber granules with a polyurethane glue as a binding agent. Alternatively, said stranding strip 6 may be made from the sound-insulating material according to the present invention.

Alternatively, said coating layer 4 horizontally extends over the load-bearing floor 2 up against the surrounding walls 5 (not represented in FIG. 1) and the above-mentioned standing strip 6 rests on the edges of the coating layer 4 (not represented in FIG. 1).

Alternatively, the coating layer 4 extends both horizontally and vertically over the load-bearing floor 2 up against the surrounding walls 5 (not represented in FIG. 1).

Preferably, the stranding strip 6 vertically extends from the load-bearing floor 2 up to the covering floor 3 and it has a thickness of from 2 mm to 20 mm, preferably of from 3 mm to 10 mm.

Optionally, in order to protect the coating layer 4 during the manufacturing of the sprung floor 1, a protective foil 7 is provided over said coating layer 4 and it is folded up against the walls 5 on the edges of the sprung floor 1.

The covering floor 3 is usually made from a hardened composition mainly comprising sand and cement, as is generally known for making fixed floors.

Further, a metal spot-welded wire netting (not represented in FIG. 1) is preferably inserted in the covering floor 3.

Said covering floor 3 extends up to under the top edge of the above-mentioned standing strip 6 so that, consequently, there is no contact between the surrounding walls 5 and the covering floor 3.

Preferably, said covering floor has a thickness of from 2 cm to 10 cm, more preferably of from 4 cm to 6 cm. Depending on the expected load of the floor, this thickness may possibly be adjusted.

To sum up, the sprung-floor 1 comprises a covering floor 3 in the shape of a rigid plate whose perimeter is practically entirely enclosed by said standing strip 6 and a coating layer 4, whereby the whole rests on the fixed load-bearing floor 2.

Usually, over said covering floor 3, after it has been hardened, a layer of a finishing material 8 (such as, tiles, wood), is placed.

The present invention will be further illustrated below by means of a number of preparation examples, which are given for purely indicative purposes and without any limitation of this invention.

Examples 1-3

Preparation of the Sound-Insulating Material

80% by weight (% by weight with respect to the total weight of the sound-insulating material) of a vulcanized rubber (ground waste rubber from scrap tyres having an average diameter of from 4 mm to 7 mm commercialized by Transeco s.r.l.) was mixed, under stirring, in a 5 liters becker, with 20% by weight (% by weight with respect to the total weight of the sound-insulating material) of the binding agent (the binding agent components are reported in Table 1—the amounts are expressed in % by weight with respect to the total weight of the binding agent), at room temperature (23° C.), until a homogeneous dispersion was obtained.

TABLE 1

| EXAMPLE | 1 | 2 | 3 |
|---|---|---|---|
| Airflex ® EAF 60 | 100 | — | — |
| Vinavil ® EVA 2615 M | — | 50 | 70 |
| Vinavil ® X 2428 | — | 50 | — |
| Crilat ® X 1815 AZ | — | — | 30 |

Airflex® EAF 60 (from Air Products): aqueous dispersion comprising 60% of vinylacetate/ethylene/acrylate terpolymer having: a glass transition temperature ($T_g$) (referred to the terpolymer in a dry form) of −35° C.; a Brookfield viscosity, measured at 23° C. and at 250 rpm, of 9.4 Pa·s; a minimum film-forming temperature of 0° C.;

Vinavil® EVA 2615 M (from Vinavil): aqueous dispersion comprising 52% of vinylacetate/ethylene copolymer having: a glass transition temperature ($T_g$) (referred to the copolymer in a dry form) of 19° C.; a Brookfield viscosity, measured at 23° C. and at 250 rpm, of 9.6 Pa·s; a minimum film-forming temperature of 2° C.;

Vinavil® X 2428 (from Vinavil): aqueous dispersion comprising 59% of vinylacrylate homopolymer having: a glass transition temperature ($T_g$) (referred to the homopolymer in a dry form) of −25° C.; a Brookfield viscosity, measured at 23° C. and at 250 rpm, of 10.5 Pa·s; a minimum film-forming temperature of 1° C.;

Crilat® X 1815 AZ (from Vinavil): aqueous dispersion comprising 49% of acrylic acid homopolymer having: a glass transition temperature ($T_g$) (referred to the homopolymer in a dry form) of −15° C.; a Brookfield viscosity, measured at 23° C. and at 250 rpm, of 0.2 Pa·s; a minimum film-forming temperature of <0° C.

The mixtures of Example 2 and 3 were subjected to the following measurement.

Brookfield Viscosity

The Brookfield viscosity was measured at 23° C. and at 250 rpm using a viscosimeter of Brookfield type, model DV3, equipped with a RV6 spindle. The obtained data are the following:
Example 2: 13.6 Pa·s;
Example 3: 8.2 Pa·s.

Minimum Filming Temperature

The minimum filming temperature was measured according to standard ISO 2115:1996. The obtained data are the following:
Example 2: 2° C.;
Example 3: 2° C.

Glass Transition Temperature ($T_g$)

The mixture of Examples 2 and 3 were subjected to Differential Scanning Calorimetry (DSC) analysis in order to measure the glass transition temperatures. The DSC analysis was conducted as follows.

First Step:
temperature scan: heating from −70° C. to +100° C. with a heating rate of 20° C./min;
temperature scan: cooling from +100° C. to −70° C. with a cooling rate of 20° C./min.

Second Step:
temperature scan: heating from −100° C. to +80° C. with a heating rate of 20° C./min.

The obtained data are the following:
Example 2: 19° C. and −25° C. (two peaks corresponding to the starting material);
Example 3: 19° C. and −15° C. (two peaks corresponding to the starting material).

The so obtained sound-insulating material was subjected to the following tests.

Dynamic Stiffness

The dynamic stiffness was measured according to standard ISO 9052-1:1989.

To this aim, the so obtained sound-insulating material was spreaded over a polyethylene sheet and was allowed drying at room temperature (23° C.), for 48 hours. A sample of the sound-insulating material having the following dimensions: 20 cm×20 cm×1 cm was removed from the above polyethylene sheet and was subjected to the dynamic stiffness measurement.

The obtained sample was placed between two metal plates which were maintained at the following conditions: 23° C., 50% of humidity. The upper plate was a 8 kg load plate corresponding to a load of 200 kg/m² that is the typical weight of the load bearing floor. The plate was subjected to an impulse frequency of from 50 Hz to 200 Hz: said impulse was generated by a generator and transferred to the upper plate by a shaker. The vibrational acceleration was measured by an accelerometer placed on the upper plate.

The dynamic stiffness was calculated according to the standard ISO 9052-1:1989 above reported and the obtained data, expressed in MN/m³, were given in Table 2.

Sound-Insulation Performance Test

The test was performed according to standard ISO 140-8:1997.

To this aim the sound-insulating material obtained as disclosed above was spreaded over a 10 m² of a standard load bearing floor to obtain a layer having 10 mm thickness and was let to harden at room temperature (23° C.). After 24 hours the standard cement covering floor was applied. The acoustic measurements were performed after 28 days and the obtained data, expressed as a noise index (L), were given in Table 2.

TABLE 2

| EXAMPLES | 1 | 2 | 3 |
|---|---|---|---|
| Dynamic stiffness (MN/m³) | 23.6 | 67.9 | 66.8 |
| (L) (dB) | 58.0 | 63.0 | 62.0 |

The invention claimed is:

1. A method for making a sound-insulating load-bearing floor, comprising:
providing a load-bearing floor;
applying a sound-insulating material onto said load-bearing floor so as to form a substantially continuous coating layer; and
allowing said substantially continuous coating layer to dry;
wherein said sound-insulating material comprises:
40% by weight to 95% by weight, with respect to the total weight of the sound-insulating material, of at least one rubber in a subdivided form; and
5% by weight to 60% by weight, with respect to the total weight of the sound-insulating material, of at least one binding agent comprising at least one water-dispersible polymer having a glass transition temperature ($T_g$) of −50° C. to +50° C. and
wherein said sound-insulating material has, in a dry form, a dynamic stiffness, measured according to standard ISO 9052-1:1989, lower than 150 MN/m³.

2. The method for making a sound-insulating load-bearing floor according to claim 1, wherein said sound-insulating material comprises 60% by weight to 90% by weight, with respect to the total weight of the sound-insulating material, of at least one rubber in a subdivided form.

3. The method for making a sound-insulating load-bearing floor according to claim 1, wherein said sound-insulating material comprises 10% by weight to 40% by weight, with respect to the total weight of the sound-insulating material, of at least one binding agent.

4. The method for making a sound-insulating load-bearing floor according to claim 1, wherein said water-dispersible polymer has a glass transition temperature ($T_g$) of −40° C. to +10° C.

5. The method for making a sound-insulating load-bearing floor according to claim 1, wherein said step of applying a sound-insulating material further comprises the step of making pre-formed sheets of said sound-insulating material.

6. The method for making a sound-insulating load-bearing floor according to claim 1, wherein said sound-insulating material is applied directly in contact with said load-bearing floor.

7. The method for making a sound-insulating load-bearing floor according to claim 1, wherein said method further comprises the step of applying a covering floor onto said load bearing floor.

8. The method for making a sound-insulating load-bearing floor according to claim 7, wherein said covering floor is applied onto said sound-insulating material.

9. The method for making a sound-insulating load-bearing floor according to claim 7, wherein said sound-insulating material is applied onto said covering floor.

10. The method for making a sound-insulating load-bearing floor according to claim 1, wherein said method further comprises the step of applying a protective foil over said sound-insulating material.

11. The method for making a sound-insulating load-bearing floor according to claim 1, wherein said sound-insulating material has, in a dry form, a dynamic stiffness, measured according to standard ISO 9052-1:1989, of 10 MN/m$^3$ to 80 MN/m$^3$.

12. The method for making a sound-insulating load-bearing floor according to claim 1, wherein said sound-insulating material has, in a dry form, a noise index, measured according to standard ISO 140-8:1997, on a sample of said sound-insulating material having a 10 mm thickness, not higher than 65 dB.

13. The method for making a sound-insulating load-bearing floor according to claim 12, wherein said sound-insulating material has, in a dry form, a noise index, measured according to ISO 140-8:1997, on a sample of said sound-insulating material having 10 mm thickness, not higher than 60 dB.

14. The method for making a sound-insulating load-bearing floor according to claim 1, wherein said sound-insulating material forms a substantially continuous coating layer having a thickness of 5 mm to 50 mm.

15. The method for making a sound-insulating load-bearing floor according to claim 14, wherein said sound-insulating material forms a substantially continuous coating layer having a thickness of 7 mm to 30 mm.

16. The method for making a sound-insulating load-bearing floor according to claim 1, wherein said sound-insulating material is made by mixing said at least one rubber in a subdivided form with said at least one binding agent.

17. The method for making a sound-insulating load-bearing floor according to claim 16, wherein said mixing is carried out at a temperature of −20° C. to +60° C., for a time of 10 seconds to 4 hours.

18. The method for making a sound-insulating load-bearing floor according to claim 16, wherein said mixing is carried out not more than 48 hours before the step of applying said sound-insulating material.

19. The method for making a sound-insulating load-bearing floor according to claim 1, wherein said step of applying a sound-insulating material is carried out by spreading said sound-insulating material onto said load-bearing floor.

20. The method for making a sound-insulating load-bearing floor according to claim 1, wherein the step of applying a sound-insulating material is carried out by spraying said sound-insulating material onto said load-bearing floor.

21. The method for making a sound-insulating load-bearing floor according to claim 1, wherein said sound-insulating material is made and applied "in situ" by:
  spreading said at least one rubber in a subdivided form onto said load-bearing floor; and
  spraying the binding agent over said rubber spread in a subdivided form to obtain a sound-insulating material, said sound-insulating material forming a substantially continuous coating layer.

22. The method for making a sound-insulating load-bearing floor according to claim 1, wherein said continuous coating layer has a drying time, at 23° C., of 10 minutes to 72 hours.

23. The method for making a sound-insulating load-bearing floor according to claim 22, wherein said continuous coating layer has a drying time, at 23° C., of 30 minutes to 24 hours.

24. The method for making a sound-insulating load-bearing floor according to claim 1, wherein said rubber in a subdivided form is in the form of powder or granules having a particle size in the range of 0.1 mm to 15 mm.

25. The method for making a sound-insulating load-bearing floor according to claim 1, wherein said rubber in a subdivided form is selected from: cis-1,4-polyisoprene, 3,4-polyisoprene, polybutadiene, halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

26. The method for making a sound-insulating load-bearing floor according to claim 1, wherein said rubber in a subdivided form is selected from:
  ethylene/propylene copolymers, ethylene/propylene/diene copolymers; polyisobutene;
  butyl rubbers; halobutyl rubbers; chlorobutyl rubbers; bromobutyl rubbers; or mixtures thereof.

27. The method for making a sound-insulating load-bearing floor according to claim 26, wherein said rubber in a subdivided form is a vulcanized rubber.

28. The method for making a sound-insulating load-bearing floor according to claim 26, wherein said water-dispersible polymer is used in the form of an aqueous solution.

29. The method for making a sound-insulating load-bearing floor according to claim 28, wherein said aqueous dispersion comprises 30% by weight to 90% by weight with respect to the total weight of the aqueous dispersion of at least one water-dispersible polymer.

30. The method for making a sound-insulating load-bearing floor according to claim 29, wherein said aqueous dispersion comprises 40% by weight to 70% by weight with respect to the total weight of the aqueous dispersion of at least one water-dispersible polymer.

31. The method for making a sound-insulating load-bearing floor according to claim 28, wherein said aqueous dispersion has a Brookfield viscosity, measured at 23° C. and at 250 rpm, of 0.2 Pa·s to 60 Pa·s.

32. The method for making a sound-insulating load-bearing floor according to claim 31, wherein said aqueous dispersion has a Brookfield viscosity, measured at 23° C. and at 250 rpm, of 0.5 Pa·s to 30 Pa·s.

33. The method for making a sound-insulating load-bearing floor according to claim 28, wherein said aqueous dispersion has a minimum film-forming temperature lower than or equal to 10° C.

34. The method for making a sound-insulating load-bearing floor according to claim 33, wherein said aqueous dispersion has a minimum film-forming temperature of −10° C. to +5° C.

35. The method for making a sound-insulating load-bearing floor according to claim 1, wherein said water-dispersible polymer is selected from polymers having a main hydrocarbon chain to which hydrophilic groups are linked.

36. The method for making a sound-insulating load-bearing floor according to claim 35, wherein said hydrophilic groups are selected from:
  hydroxyl groups —OH, or derivatives thereof, —OR groups wherein R=alkyl or hydroxyalkyl;
  carboxylic groups —COOH, or carboxylic groups at least partially in the salt form;
  ester groups —COOR wherein R=alkyl or hydroxyalkyl;

amide groups —CONH$_2$; and sulfonic groups —SOH3, or sulfonic groups at least partially in the salt form.

37. The method for making a sound-insulating load-bearing floor according to claim 35, wherein said polymers having a main hydrocarbon chain to which hydrophilic groups are linked are selected from:

(i) homopolymers obtained by the polymerization of an ethylenically unsaturated carboxylic acid monomer or a derivative thereof; or anhydrides, esters or salts of an ethylenically unsaturated carboxylic acid monomer; or by the polymerization of an aliphatic vinyl ester monomer; or by the polymerization of an aliphatic vinyl ether monomer;

(ii) copolymers obtained by the copolymerization of at least one aliphatic or aromatic olefinic monomer, with at least one ethylenically unsaturated carboxylic acid monomer or a derivative thereof, or with at least one anhydride, ester or salt of an ethylenically unsaturated carboxylic acid monomer; or with at least one aliphatic vinyl ester monomer, or with at least one aliphatic vinyl ether monomer; or copolymers obtained by the polymerization of an ethylenically unsaturated carboxylic acid monomer or a derivative thereof, or anhydrides, esters or salts of an ethylenically unsaturated carboxylic acid monomer, with at least one aliphatic vinyl ester monomer, or with at least one aliphatic vinyl ether monomer; and (iii) terpolymers obtained by the polymerization of at least one aliphatic or aromatic olefinic monomer, with at least one ethylenically unsaturated carboxylic acid monomer or a derivative thereof, or anhydrides, esters or salts of an ethylenically unsaturated carboxylic acid monomer, and with at least one aliphatic vinyl ester monomer or with at least one aliphatic vinyl ether monomer;

or mixtures thereof.

38. The method for making a sound-insulating load-bearing floor according to claim 37, wherein said homopolymers (i) are: poly (meth) acrylic acid, polyalkylacrylamide, polyhydroxyalkylate, polyalkylacrylate, polyvinyl-acetate, polyvinylalcohol, or mixtures thereof.

39. The method for making a sound-insulating load-bearing floor according to claim 37, wherein said copolymers (ii) are:

vinylacetate/ethylene copolymers, vinylacetate/alkylacrylate copolymers, ethylene/alkyl-acrylate copolymers, vinylacetate/vinylversatate copolymers, vinylacetate/butylmaleate copolymers, styrene/acrylate copolymers, styrene/acrylic acid/copolymers, or mixtures thereof.

40. The method for making a sound-insulating load-bearing floor according to claim 37, wherein said terpolymers (iii) are: vinylacetate/ethylene/acrylate terpolymers, vinylalcohol/ethylene/vinylacetate terpolymers, or mixtures thereof.

41. The method for making a sound-insulating load-bearing floor according to claim 28, wherein said aqueous dispersion further comprises: protective colloids; surfactants; plasticizers; humectants; filming aids and coalescing agents; inorganic fillers; pigments; dyes; antiseptic agents; antifoaming agents; or mixtures thereof.

42. A sound-insulating material comprising:

40% by weight to 95%' by weight, with respect to the total weight of the sound-insulating material, of at least one rubber in a subdivided form; and 5% by weight to 60% by weight, with respect to the total weight of the sound-insulating material, of at least one binding agent comprising at least one water-dispersible polymer having a glass transition temperature ($T_g$) of −50° C. to +50° C., the sound-insulating material having, in a dry form, a dynamic stiffness, measured according to standard ISO 9052-1: 1989, lower than 150 MN/m$^3$.

43. The sound-insulating material according to claim 42, comprising 60% by weight to 90% by weight, with respect to the total weight of the sound-insulating material, of at least one rubber in a subdivided form.

44. The sound-insulating material according to claim 42, comprising 10% by weight to 40% by weight, with respect to the total weight of the sound-insulating material, of at least one binding agent.

45. The sound-insulating material according to claim 42, wherein said water-dispersible polymer has a glass transition temperature (Tg) of −40° C. to +10° C.

46. The sound-insulating material according to claim 42, having, in a dry form, a dynamic stiffness, measured according to standard ISO 9052-1: 1989, of 10 MN/m$^3$ to 80 MN/m$^3$.

47. The sound-insulating material according to claim 42, having, in a dry form, a noise index, measured according to standard ISO 140-8:1997, on a sample of said sound-insulating material having a 10 mm thickness, not higher than 65 dB.

48. The sound-insulating material according to claim 47, having, in a dry form, a noise index, measured according to ISO 140-8:1997, on a sample of said sound-insulating material having 10 mm thickness, not higher than 63 dB.

49. The sound-insulating material according to claim 42, wherein said at least one rubber in a subdivided form is in the form of powder or granules having a particle size in the range of 0.1 mm to 15 mm; or wherein said rubber in a subdivided form is selected from: cis-1,4-polyisoprene, 3,4-polyisoprene, polybutadiene, halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof; or wherein said rubber in a subdivided form is selected from: ethylene/propylene copolymers; ethylene/propylene/diene copolymers; ethylene/propylene/diene copolymers; polyisobutene; butyl rubbers; halobutyl rubbers; chlorobutyl rubbers; or bromobutyl rubbers; or mixtures thereof; or wherein said rubber in a subdivided form is a vulcanized rubber.

50. The sound-insulating material according to claim 42, wherein said at least one water-dispersible polymer is used in the form of an aqueous dispersion, wherein:

said aqueous dispersion comprises 30% by weight to 90% by weight with respect to the total weight of the aqueous dispersion of at least one water-dispersible polymer; or wherein said aqueous dispersion comprises 40% by weight to 70% by weight with respect to the total weight of the aqueous dispersion of at least one water-dispersible polymer; or wherein said aqueous dispersion has a Brookfield viscosity, measured at 23° C. and at 250 rpm, of 0.2 Pa·s to 60 Pa·s; or wherein said aqueous dispersion has a Brookfield viscosity, measured at 23° C. and at 250 rpm, of 0.5 Pa·s to 30 Pa·s; or wherein said aqueous dispersion has a minimum film-forming temperature lower than or equal to 10° C.; or wherein said aqueous dispersion has a minimum film-forming temperature of −10° C. to +5° C.

51. The sound-insulating material according to claim 42, wherein said at least one water-dispersible polymer is selected from polymers having a main hydrocarbon chain to which hydrophilic groups are linked.

52. The sound-insulating material according to claim 50, wherein said aqueous dispersion further comprises: protective colloids; surfactants; plasticizers; humectants; filming aids and coalescing agents; inorganic fillers; pigments; dyes; antiseptic agents; antifoaming agents; or mixtures thereof.

53. A building structure comprising at least one load-bearing floor, said load-bearing floor comprising a sound-insulating material according to claim 42.

* * * * *